United States Patent
Thomas, Jr. et al.

(10) Patent No.: US 7,111,184 B2
(45) Date of Patent: Sep. 19, 2006

(54) SYSTEM AND METHOD FOR DETERMINISTIC COMMUNICATION ACROSS CLOCK DOMAINS

(75) Inventors: Thomas L. Thomas, Jr., Austin, TX (US); Daniel W. Knox, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 650 days.

(21) Appl. No.: 10/236,834

(22) Filed: Sep. 6, 2002

(65) Prior Publication Data

US 2004/0049708 A1    Mar. 11, 2004

(51) Int. Cl.
*G06F 1/12* (2006.01)
*H04L 7/00* (2006.01)
*H04L 7/04* (2006.01)

(52) U.S. Cl. ............... 713/401; 713/400; 713/600; 713/601; 375/362; 375/371

(58) Field of Classification Search ................ None
See application file for complete search history.

(56) References Cited

U.S. PATENT DOCUMENTS

| | | | |
|---|---|---|---|
| 6,003,118 A * | 12/1999 | Chen ................. | 713/401 |
| 6,269,051 B1 * | 7/2001 | Funaba et al. ............. | 365/233 |
| 6,323,705 B1 * | 11/2001 | Shieh et al. ............... | 327/158 |
| 6,839,860 B1 * | 1/2005 | Lin ............................ | 713/401 |
| 6,895,522 B1 * | 5/2005 | Johnson et al. ............ | 713/401 |
| 2003/0012320 A1 * | 1/2003 | Bell ........................... | 375/376 |
| 2003/0094984 A1 * | 5/2003 | Weis et al. ................. | 327/182 |

OTHER PUBLICATIONS

Bearden et al., "A 780 MHz Power PC Microprocessor with Integrated 1.2 Cache," 2000 IEEE International 2000 Digest of Technical Papers, vol. Forty-Three, 4 pgs.

Gatto et al., "A 780 MHz Power PC Microprocessor with Integrated 1.2 Cache," 2000 IEEE International Slide Supplement 2000 to the Digest of Technical Papers, vol. Forty-Three, 6 pgs.

* cited by examiner

*Primary Examiner*—James K. Trujillo
(74) *Attorney, Agent, or Firm*—Daniel D. Hill

(57) ABSTRACT

A clock distribution and control system (10) includes one counter (30) in a clock generation domain and another counter (40) in a phase-delayed clock domain. The phase-delayed domain counter (40) output is combined with a programmable offset value chosen based on the phase delay of the clock distribution system. The result is used to insure that communication between logic in the clock generation clock domain and logic in the phase-delayed clock domain occurs deterministically on the correct clock edge for a range of clock frequencies.

10 Claims, 3 Drawing Sheets

SYSTEM AND METHOD FOR DETERMINISTIC COMMUNICATION ACROSS CLOCK DOMAINS

FIELD OF THE INVENTION

The present invention generally relates to deterministic communication in a clocked system and method therefor, and more specifically relates to deterministic communication in a clocked system in which there are clock phase delays.

RELATED ART

In an integrated circuit data processing system, a clock signal is typically generated and distributed across the integrated circuit for controlling timing of the many functions of the chip. In larger and more complex data processing systems operating at high speed, there may be a significant time delay between when a clock edge is generated at a clock source, and when the same clock edge is propagated to the endpoints of the clock distribution network. The time delay may be due in part to the number of gate delays to which the clock signal is subjected as it transits the chip, or it may be due to the length of the conductors routed across the chip. Clock edges of a distributed clock signal do not arrive at the same time at each part of the chip because of the above distribution delay. A problem arises when logic operating in one clock domain interfaces with logic operating in another domain and the phase delay between the two domains is large enough to cause information to arrive on the wrong clock edge.

Specifically, the above cross-clock-domain communication problem has been observed in a system where the logic operating at one point of the clock distribution system must communicate information to logic operating at another point of the clock distribution system. In the past, in systems where the clock distribution delay has been less than one clock period, the communication has been possible using standard synchronous design techniques. However, in recently developed systems having much faster clock frequencies operating on larger chips, the clock distribution delay may be significantly longer than one clock period, thus making deterministic communication using traditional synchronous design techniques impossible.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Generally, the present invention provides, in one embodiment, a clock distribution system that includes one 2-bit counter in a clock generation domain and another 2-bit counter in a phase delayed domain. The most significant bit of each of the 2-bit counters is used as a lower frequency clock that has a relatively insignificant phase difference compared to the period. In another embodiment, the phase delayed domain counter output is combined with a programmable offset that is chosen based on the phase delay between the clock generation domain and the phase delayed domain. The result is used to insure that communication between logic in the clock generation clock domain and logic in the phase delayed, or phase shifted, clock domain occurs on the correct clock edge.

The present invention provides the advantage of having a software configurable technique to facilitate deterministic communication for a wide range of phase offsets. Also, the amount of logic used to compensate for the clock phase difference is independent of the amount of phase delay or clock period. In contrast to prior known solutions, in the proposed solution, logic design scrutiny is used to verify operation instead of the more difficult and time consuming circuit design scrutiny. Further, circuit retuning is not required if the manufacturing process changes. A different phase delay, caused by manufacturing process changes on an existing design, can be compensated for by re-programming the offset value.

Figure 1:
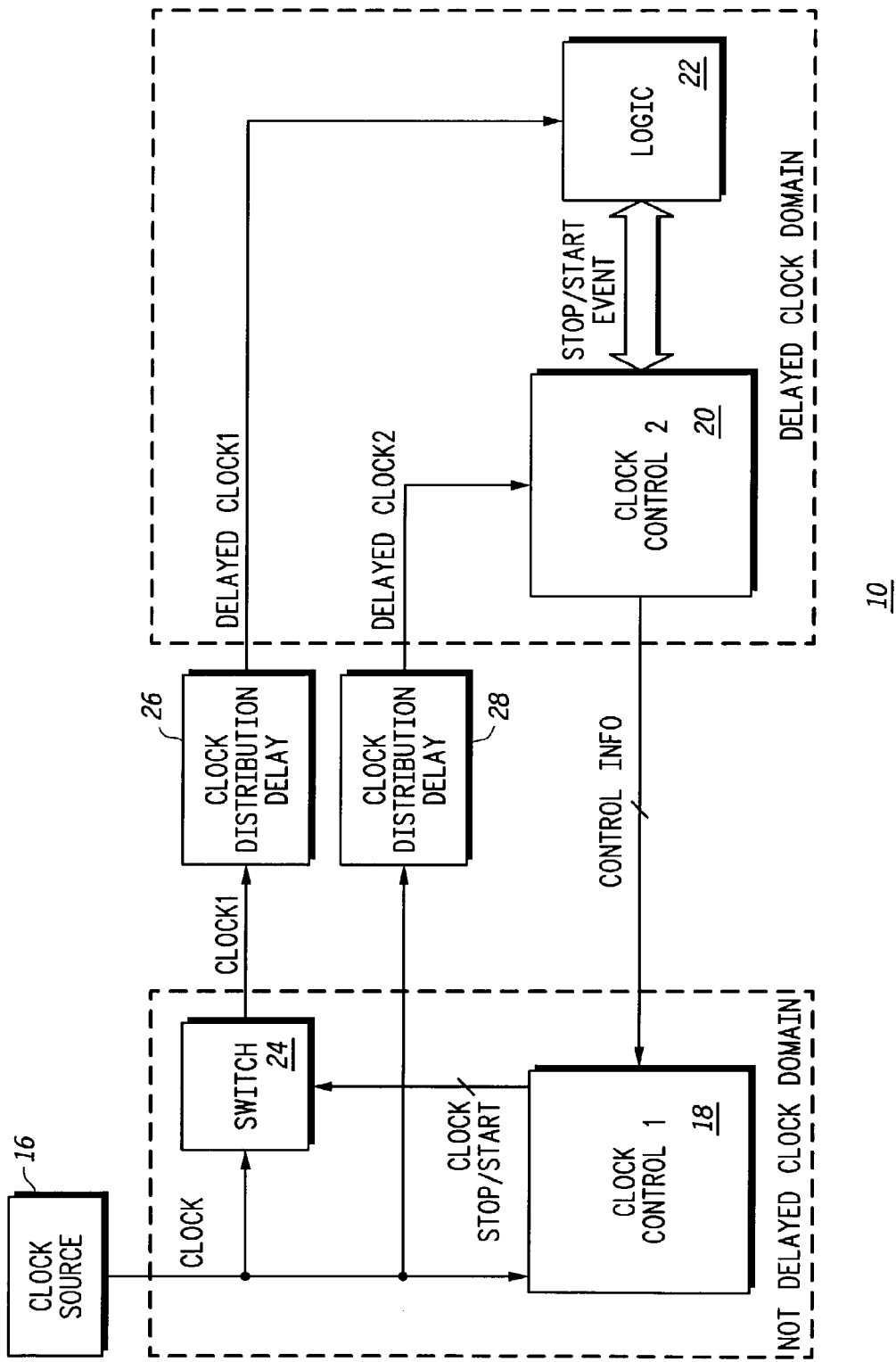
FIG. 1 illustrates, in block diagram form, a clock distribution and control system on a data processing system in accordance with one embodiment of the present invention.

FIG. 1 illustrates, in block diagram form, an integrated circuit clock distribution and control system 10 in accordance with the present invention. Clock distribution and control system 10 includes a clock source 16, a clock control block 18, a second clock control block 20, a logic circuit 22, and clock distribution delays 26 and 28. Clock source 16 may be generated on the same integrated circuit or may be generated externally to clock distribution system 10. As illustrated in FIG. 1, clock 16 generates a clock signal labeled "CLOCK" in a clock domain that is not delayed. The clock signal CLOCK is transmitted to logic circuitry in parts of the integrated circuit that may be a relatively long distance from clock 16 in terms of gate delays, propagation delays, or both. The logic circuitry in the part of the integrated circuit that receives a phase-delayed clock signal from clock 16 is referred to as logic 22 in FIG. 1. A delay path that causes the phase delay that the clock signal would traverse when it is transmitted to logic 22 is illustrated in FIG. 1 as clock distribution delay 26. The delayed clock signal from clock distribution delay 26 is labeled "DELAYED CLOCK 1". A delay path that the clock signal would traverse on its way to clock control 20 is represented by clock distribution delay 28. The delayed clock signal from clock distribution delay 28 is labeled "DELAYED CLOCK 2". In other words, the "not delayed clock domain" and the "delayed clock domain" are separated by clock distribution delay 26. Logic 22 is a functional block of a data processing system having clock distribution and control system 10 that can be adversely affected by a phase-delayed clock. Therefore, the specific function of logic 22 is not important for purposes of the describing the invention. Logic 22 must communicate with a functional block in the "Not Delayed Clock Domain".

Logic 22 receives DELAYED CLOCK 1 and is bi-directionally coupled to clock control 20 for transmitting signals including START/STOP EVENT signals. Note that even though the START/STOP EVENT signals originate in logic 22, the START/STOP EVENT signals could be generated by external logic. Clock control 20 receives DELAYED CLOCK 2 and provides control information to clock control 18. Clock control 18 receives clock signal CLOCK and CONTROL INFO signals from clock control 20, and provides CLOCK STOP/START signals to switch 24.

In the illustrated embodiment, switch 24 is used to inhibit (STOP) clock signal CLOCK from being propagated to other parts of the integrated circuit via clock distribution system 26. The clock signal is stopped based on an event occurring in logic 22. The event may be, for example, the data processing system entering a low power mode of operation. Switch 24 is controlled from logic 22 via clock control 20 in the delayed clock domain and clock control 18 in the not delayed clock domain.

In a large complex system operating with a relatively high-speed clock, the phase difference between the delayed clock domain and the not delayed clock domain may be greater than one clock period. To make the assertion of CLOCK STOP/START occur on the correct edge of clock signal CLOCK, clock control 20 and clock control 18 both contain, in one embodiment, a frequency divider circuit that reduces the frequency of their respective clocks. At the reduced clock frequency the distribution delay 28 is relatively insignificant, thus allowing synchronous transfer of the control information that controls switch 24 so that the assertion of CLOCK STOP/START can be assured to happen at the correct clock phase of clock signal CLOCK. In one embodiment, the frequency dividers are implemented as 2-bit binary counters where the most significant bit is used as the lower frequency clock signal. Note that even though the system illustrated in FIG. 1 applies the present invention to the stopping of a clock, one of ordinary skill in art will know that the present invention may be applied to other systems where a functional unit in one clock domain controls an operation in another clock domain. For example, clock control logic 20 may similarly re-start the clock by passing appropriate control information to clock control block 18.

Figure 2:
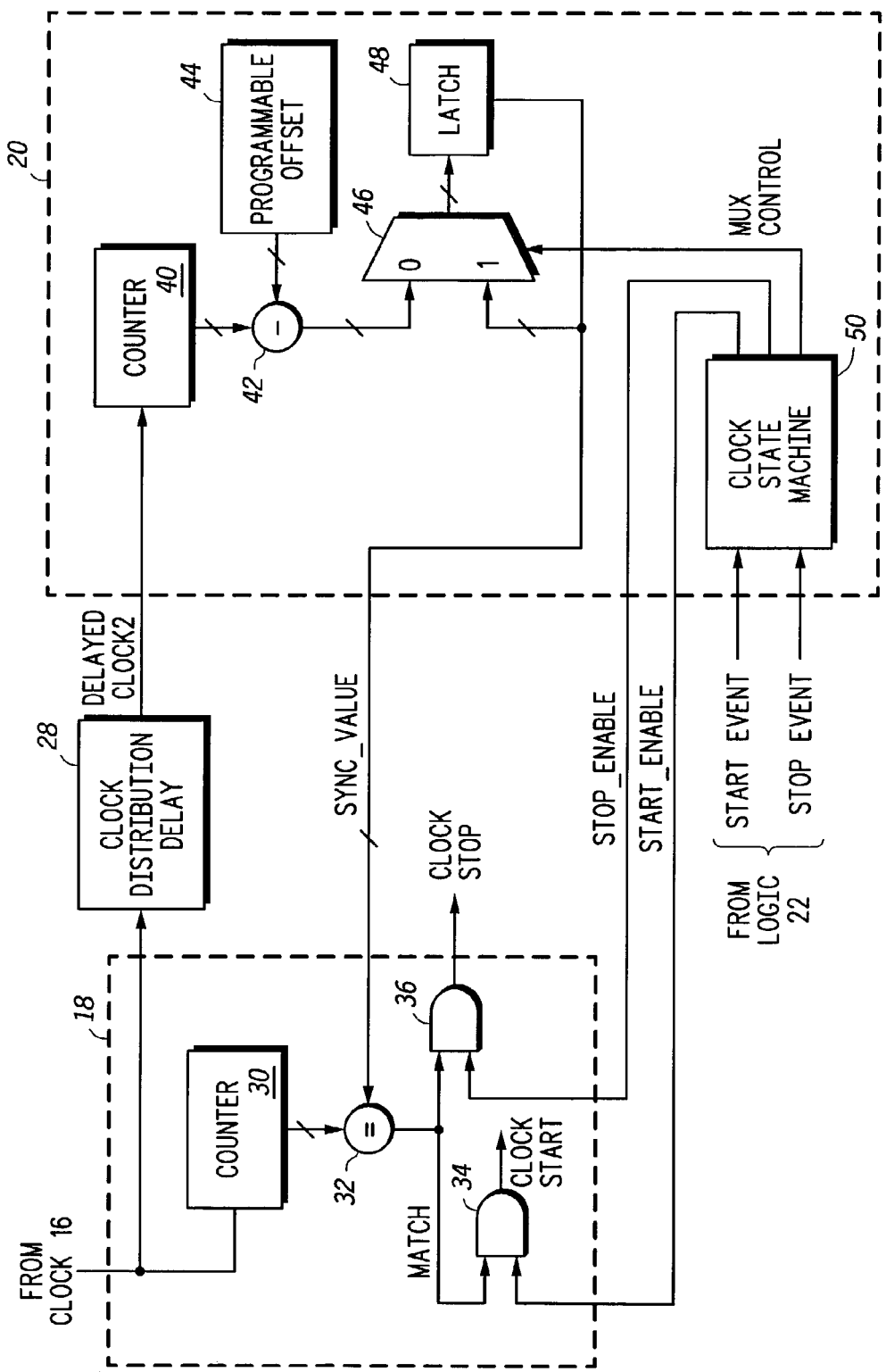
FIG. 2 illustrates, in block diagram form, the clock distribution and control system of FIG. 1 in accordance with another embodiment of the present invention.

FIG. 2 illustrates, in block diagram form, a portion of clock distribution and control system 10 of FIG. 1 in accordance with another embodiment of the present invention. Note that in FIGS. 1 and 2, elements that have the same or similar functions are labeled with the same reference number. In FIG. 2, clock control block 18 includes counter 30, comparator 32, and AND logic gates 34 and 36. Clock control block 20 includes counter 40, subtraction circuit 42, programmable offset 44, multiplexer 46, latch 48, and clock state machine 50. Counters 30 and 40 are implemented as 5-bit down counters. In other embodiments counters 30 and 40 may be implemented with different bit widths and count sequences depending on how large an offset is desired. A phase-delayed clock domain is separated from a not-delayed clock domain by a clock distribution delay 28. Clock distribution delay 28 includes logic gates, latches, conductors, and other circuitry that contributes to the phase-delayed clock signal labeled "DELAYED CLOCK 2".

Counter 30 receives clock signal CLOCK from clock 16 in FIG. 1, and provides a counter value to an input of comparator 32. Comparator 32 also receives a latched signal labeled "SYNC VALUE" from latch 48, and in response, provides a MATCH signal to an input of AND logic gate 36 when the output of counter 30 and the output of latch 48 are the same. AND logic gate 36 also receives a STOP ENABLE signal from clock state machine 50. An output of AND logic gate 36 provides CLOCK STOP to an input of a switch 24, shown in FIG. 1. AND logic gate 34 receives the MATCH signal and a START ENABLE signal from clock state machine 50. In response, AND logic gate 34 provides signal CLOCK START to the input of switch 24.

Counter 40 receives DELAYED CLOCK 2 and provides a 5-bit output to an input of subtraction circuit 42. Subtraction circuit 42 has another input for receiving an offset value from programmable offset 44. An output of subtraction circuit 42 is provided to an input of multiplexer 46. Multiplexer 46 also receives the output of latch 48 and provides an output signal to an input of latch 48. Clock state machine 50 has inputs coupled to logic 22 for receiving START EVENT and STOP EVENT signals. Clock state machine 50 has an output for providing signal MUX CONTROL to a control input of multiplexer 46, an output for providing START ENABLE to AND logic gate 34, and an output for providing STOP ENABLE to AND logic gate 36.

In operation, DELAYED CLOCK 2 is phase delayed relative to clock signal CLOCK as discussed above. A programmable offset value is stored in programmable offset register 44 that is based on the phase delay caused by clock distribution delay 28. The programmable offset value may be set by an integrated circuit designer to account for the phase delay caused by clock distribution delay 28. In one embodiment, the programmable offset value may be determined by dividing the propagation delay of clock distribution delay 28 by the period of clock signal CLOCK and adding a constant. The constant is intended to provide some margin to account for system variation and protocol overhead. Subtraction circuit 42 determines a difference of the counter 40 value and the programmable offset 44 value and provides the result to an input of multiplexer 46. Muliplexer 46 provides an output as determined by MUX CONTROL. MUX CONTROL is asserted when a STOP EVENT or START EVENT occurs. MUX CONTROL is asserted for a predetermined time to allow for gate delays in the system and/or a feedback signal from logic 22 (see FIG. 1) indicating that a specific event has occurred. The output of latch 48 is then provided to an input of comparator 32. When the output of counter 30 is the same as the output of latch 48, a MATCH signal is asserted to the inputs of AND logic gates 34 and 36. The output of each of the AND logic gates is used to control switch 24 (FIG. 1) in conjunction with the STOP ENABLE and START ENABLE signals from the clock state machine 50. The programmable offset is used to insure that the CLOCK STOP and CLOCK START signals are asserted on the appropriate edge of clock signal CLOCK.

Figure 3:
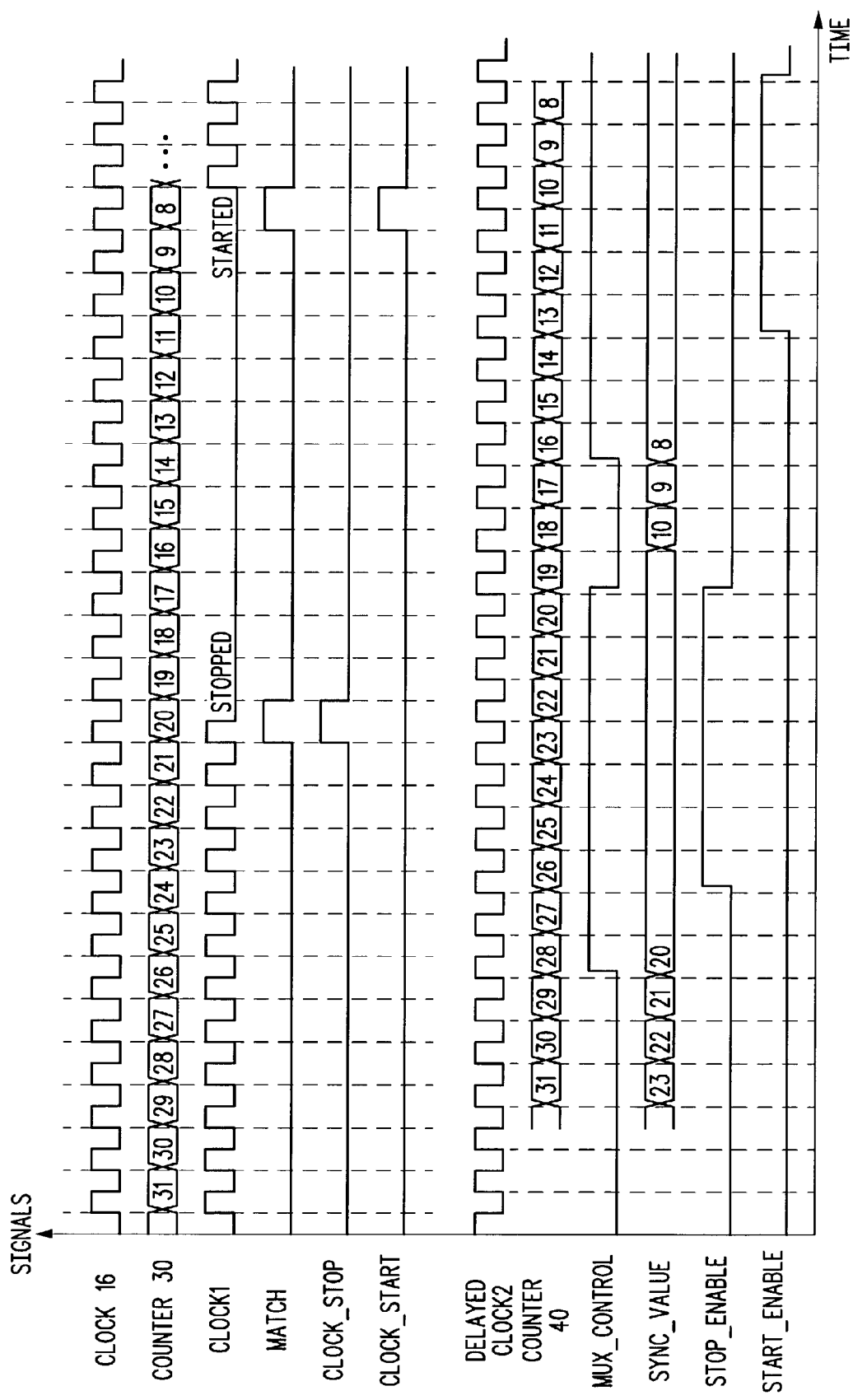
FIG. 3 illustrates a timing diagram of various signals of the embodiments shown in FIG. 1 and FIG. 2.

FIG. 3 illustrates a timing diagram of various signals of the embodiment shown in FIG. 1 and FIG. 2. FIG. 3 illustrates the clock signal CLOCK1 stopping and restarting in accordance with the present invention using a programmable offset value of 8. CLOCK 1 is stopped when counter 30 counts down to a count value of 20. Clock 1 is restarted when counter 30 counts down to a count value of 8.

First, consider the sequence of events for clock stopping. In response to a STOP EVENT signal from logic 22, clock state machine 50 asserts MUX CONTROL to capture the output of multiplexer 46 into latch 48. Subsequently, clock state machine 50 asserts STOP ENABLE at count value 26 of counter 40. As illustrated in FIG. 2 and FIG. 3, AND logic gate 36 provides CLOCK STOP when counter 30 outputs a value of 20. Because the offset value in programmable offset register 44 is 8, the output of latch 48 corresponds to counter value 23 when counter 40 is at count value 31, and the MATCH signal is asserted when counter 30 reaches a count value of 20, corresponding to the output of latch 48. The value in latch 48 is held constant for a predetermined duration as discussed above.

Second, consider the sequence of events for clock starting. It is desired that clock signal CLOCK 1 is restarted when counter 30 reaches a value of 8. MUX CONTROL is asserted when the value of counter 40 is 16, thus insuring that latch 48 has value 8. The output of multiplexer 46 can be held in latch 48 for a predetermined amount of time. The START ENABLE signal is asserted, and when MATCH is asserted as a result of a favorable comparison in comparator 32, CLOCK 1 will be restarted when counter 30 reaches a value of 8, as desired.

By using a counter in each of the clock domains along with the programmable offset and the other logic described herein, signals crossing between the two clock domains can be captured on the correct clock edge, resulting in deterministic and predictable communication between the circuit portions. This is accomplished in the illustrated embodiment by determining a phase delay caused by the clock distribution delay and applying an offset, calculated from the clock distribution delay, to the generation of a control signal or message in a data processing system. Also, the use of a programmable offset allows a designer to change the value to offset phase delays for a range of clock frequencies.

In the foregoing specification, the invention has been described with reference to specific embodiments. However, one of ordinary skill in the art appreciates that various modifications and changes can be made without departing from the scope of the present invention as set forth in the claims below. For example, a system could have more than one comparator and more than one programmable offset if it is desirable to start and stop a clock in a time period that is close to the offset. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for deterministic communication across clock domains in a data processing system comprising the steps of:
    generating a first clock for driving a first clock domain of the data processing system and generating a second clock for driving a second clock domain of the data processing system, the second clock being time delayed from the first clock by a clock distribution delay;
    determining a phase delay caused by the clock distribution delay, and applying a programmable offset, calculated based on the clock distribution delay, to stop the first clock for a time period to produce an adjusted first clock, the adjusted first clock for compensating for the clock distribution delay for a predetermined portion of the second clock domain; and
    transmitting a signal from the second clock domain to the first clock domain in response to an event occurring in the predetermined portion of the second clock domain, the signal being received in the first clock domain on a predetermined edge of the adjusted first clock.

2. The method of claim 1, wherein the first clock is stopped in response to a first counter value in the first clock domain comparing favorably to a synchronizing value transmitted from the second clock domain, wherein the synchronizing value is derived using the programmable offset.

3. The method of claim 2, wherein the synchronizing value is determined by subtracting the programmable offset from a second counter value, wherein the second counter value is generated in the second clock domain based on a delayed first clock from the first clock domain.

4. The method of claim 3, wherein the programmable offset is programmed by setting one or more bits in a register.

5. A system comprising:
    a first clock domain driven by a first clock, wherein the first clock domain includes a first clock divider providing a first value derivative of the first clock;
    a second clock domain driven by a second clock phase shifted from the first clock, wherein the second clock domain includes a second clock divider providing a second value derivative of the second clock; and
    a signal means comprising a difference calculator for generating a modified value from the second value by modifying the second value by a predetermined offset for generating a message dependent on the modified value when an event occurs in the second clock domain; and
    means for acting on the message in the first clock domain in accordance with the first value.

6. The system of claim 5 wherein the signal means further comprises a latch and a multiplexer for capturing and holding the modified value.

7. The system of claim 6 wherein the means for acting comprises a comparator and a logic function for generating a control value when the first value matches the modified value.

8. The system of claim 5 wherein the means for acting comprises a comparator and a logic function for generating an action signal when the first value matches a control value.

9. A system comprising:
    a first clock domain including:
        a switch for receiving a first clock and a control signal permitting the first clock to propagate to a portion of a second clock domain;
        a first clock divider for providing a divided clock value derivative of the first clock;
        a comparator for receiving the divided clock value and a synchronization value from the second clock domain and generating a match signal when the divided clock value matches the synchronization value; and
        a logic circuit for receiving the match signal and generating the control signal in response to one of either a stop enable signal or a start enable signal;
    the second clock domain including:
        a second clock divider for receiving a second clock signal phase shifted from the first clock signal by a delay and providing a divided clock value derivative of the second clock;
        a difference calculator for receiving the divided clock value and a predetermined offset and providing the synchronization value;
        a mutliplexer and a latch for capturing the synchronization value when the multiplexer receives a multiplexer enable signal; and
        a state machine for receiving an event from the portion of the second clock domain and generating the stop enable signal, the start enable signal and the multiplexer enable signal.

10. The system of claim 9 wherein the first clock divider and the second clock dividers are counters.

* * * * *